«12» United States Patent
Morii

«10» Patent No.: US 11,101,682 B2
«45» Date of Patent: Aug. 24, 2021

«54» POWER RECEIVING APPARATUS AND CONTROL METHOD

«71» Applicant: CANON KABUSHIKI KAISHA, Tokyo (JP)

«72» Inventor: Takashi Morii, Yokohama (JP)

«73» Assignee: CANON KABUSHIKI KAISHA, Tokyo (JP)

«*» Notice: Subject to any disclaimer, the term of this patent is extended or adjusted under 35 U.S.C. 154(b) by 329 days.

«21» Appl. No.: 16/039,464

«22» Filed: Jul. 19, 2018

«65» Prior Publication Data

US 2019/0027956 A1 Jan. 24, 2019

«30» Foreign Application Priority Data

Jul. 21, 2017 (JP) .............................. JP2017-141999

«51» Int. Cl.
| H02J 7/02 | (2016.01) |
| H04B 5/00 | (2006.01) |
| H02J 50/80 | (2016.01) |
| H02J 50/10 | (2016.01) |
| H02J 7/00 | (2006.01) |

«52» U.S. Cl.
CPC ............ H02J 7/027 (2013.01); H02J 7/025 (2013.01); H02J 50/10 (2016.02); H02J 50/80 (2016.02); H04B 5/0037 (2013.01); H02J 7/00045 (2020.01)

«58» Field of Classification Search
CPC .................................. H02J 7/00; H02J 7/027
See application file for complete search history.

«56» References Cited

U.S. PATENT DOCUMENTS

| 2009/0158053 | A1 | 6/2009 | Ikeuchi et al. |
| 2017/0053501 | A1* | 2/2017 | Kamiwano ............ G06F 21/44 |
| 2017/0104354 | A1* | 4/2017 | Toguchi .................... H02J 7/00 |

FOREIGN PATENT DOCUMENTS

| JP | 2009-151953 A | 7/2009 |
| JP | 2012-053999 A | 3/2012 |

* cited by examiner

*Primary Examiner* — Robert Grant
«74» *Attorney, Agent, or Firm* — Cowan, Liebowitz & Latman, P.C.

«57» ABSTRACT

A power receiving apparatus comprises a power receiving unit that receives first power or second power from a power transmission apparatus; and a control unit that (a) requests the power transmission apparatus to transmit the first power, (b) determines whether or not a battery is a genuine battery by using the first power transmitted from the power transmission apparatus, (c) requests the power transmission apparatus to transmit the second power, when the battery is not a genuine battery, and (d) notifies a user of a reason why the battery is not being charged by using the second power transmitted from the power transmission apparatus.

15 Claims, 5 Drawing Sheets

POWER RECEIVING APPARATUS AND CONTROL METHOD

BACKGROUND

Field of the Invention

Aspects of the disclosure generally relate to an apparatus, method, program, or the like for charging a battery.

Description of the Related Art

Some batteries that are not genuine (called "non-genuine batteries" hereinafter) have insufficient battery protection functions. For this reason, some electronic devices are provided with authentication functions for determining whether or not a connected power source is a genuine battery. Japanese Patent Laid-Open No. 2009-151953 describes a battery authentication method for determining whether or not a connected power source is a genuine battery.

A genuine battery conforms to a predetermined charging profile, but it is unclear as to whether or not a non-genuine battery conforms to a predetermined charging profile. Thus if a connected power source is a non-genuine battery, stopping the charging of that battery can be considered as a safety measure. If the charging of a non-genuine battery is stopped, it is desirable that the user be notified that the charging of the non-genuine battery has been stopped. Japanese Patent Laid-Open No. 2012-53999 describes a method for notifying a user that the charging of a battery has stopped in a simple manner, by lighting an LED.

However, with the method described in Japanese Patent Laid-Open No. 2012-53999, the user cannot be notified of detailed information, such as the reason why the battery is not being charged, in an easily-understandable manner.

SUMMARY

According to an aspect of the embodiments, an apparatus, system, method, program, or the like capable of notifying a user of a reason why a battery is not being charged or the like in an easily-understandable manner.

According to an aspect of the embodiments, there is provided a power receiving apparatus comprising: a power receiving unit that receives first power or second power from a power transmission apparatus; and a control unit that (a) requests the power transmission apparatus to transmit the first power, (b) determines whether or not a battery is a genuine battery by using the first power transmitted from the power transmission apparatus. (c) requests the power transmission apparatus to transmit the second power, when the battery is not a genuine battery, and (d) notifies a user of a reason why the battery is not being charged by using the second power transmitted from the power transmission apparatus.

According to an aspect of the embodiments, there is provided a method comprising: requesting a power transmission apparatus to transmit first power; determining whether or not a battery is a genuine battery by using the first power transmitted from the power transmission apparatus; requesting the power transmission apparatus to transmit second power, when the battery is not a genuine battery; and notifying a user of a reason why the battery is not being charged by using the second power transmitted from the power transmission apparatus.

According to an aspect of the embodiments, there is provided a non-transitory storage medium that stores a program causing a computer to execute a method, the method comprising: requesting a power transmission apparatus to transmit first power; determining whether or not a battery is a genuine battery by using the first power transmitted from the power transmission apparatus; requesting the power transmission apparatus to transmit second power, when the battery is not a genuine battery; and notifying a user of a reason why the battery is not being charged by using the second power transmitted from the power transmission apparatus.

Further aspects of the embodiments will become apparent from the following embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
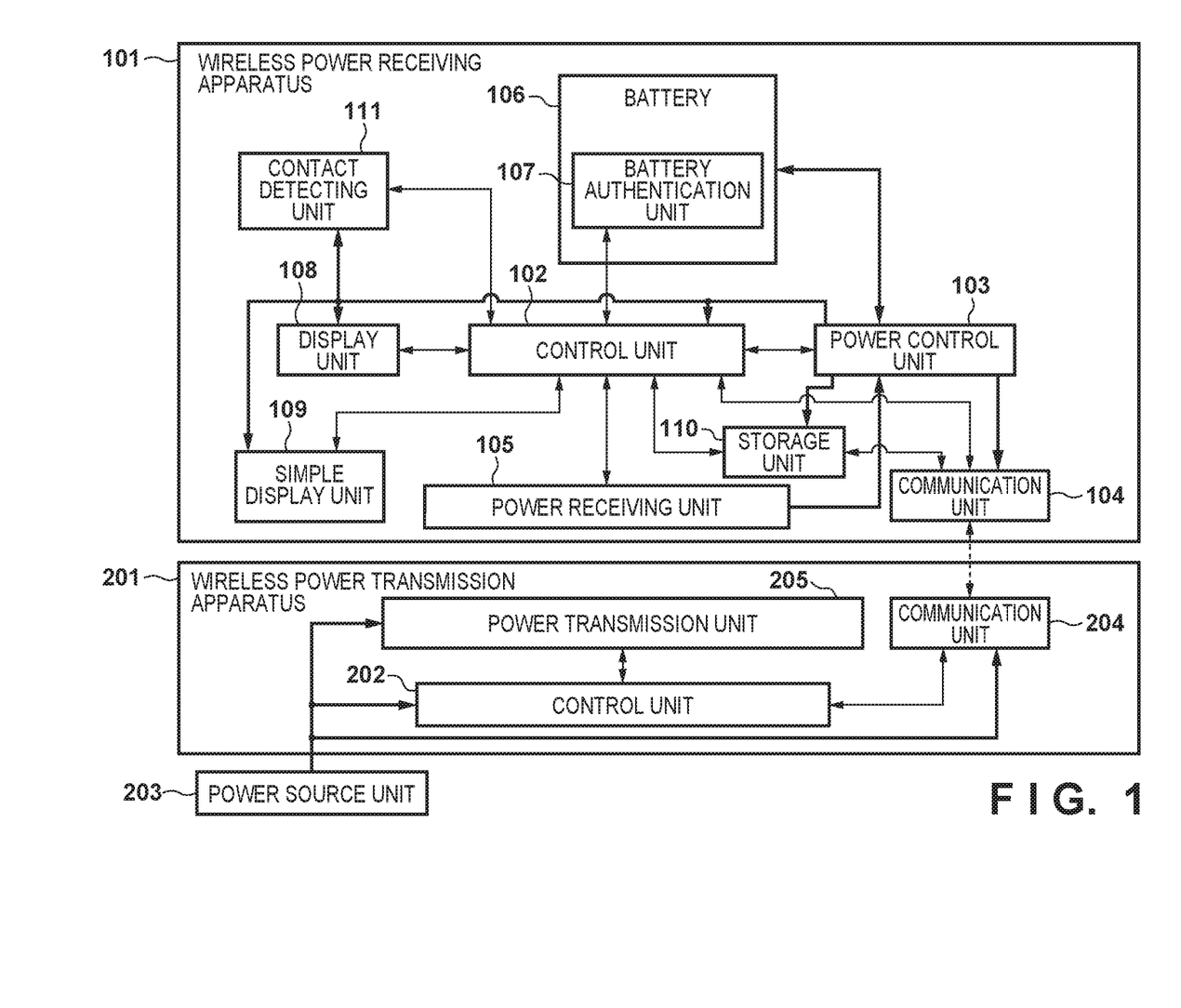
FIG. 1 is a block diagram illustrating components of a wireless power receiving apparatus 101 according to a first embodiment and components of a wireless power transmission apparatus 201 according to the first embodiment.

Components of a wireless power receiving apparatus 101 according to the first embodiment and components of a wireless power transmission apparatus 201 according to the first embodiment will be described with reference to FIG. 1. In FIG. 1, bold arrows indicate the flow of power, and normal arrows indicate the flow of data or signals.

The wireless power receiving apparatus 101 is an apparatus that receives power transmitted from the wireless power transmission apparatus 201. The wireless power receiving apparatus 101 is capable of functioning as at least one of an image capture apparatus (e.g., a digital camera), a mobile phone (e.g., a smartphone), or a mobile terminal (e.g., a tablet terminal).

A control unit 102 includes a memory storing programs for controlling the various components of the wireless power receiving apparatus 101, which will be described later, and a processor controlling the various components of the wireless power receiving apparatus 101 by executing the programs stored in that memory. The processor of the control unit 102 is a hardware processor, for example.

A power control unit 103 supplies power, supplied from a battery 106 or a power receiving unit 105, to the various components of the wireless power receiving apparatus 101. The power control unit 103 has a function for controlling power supplied to the various components of the wireless power receiving apparatus 101, and a function for controlling the charging of the battery 106.

A communication unit 104 communicates wirelessly with a communication unit 204. The wireless communication between the communication unit 104 and the communication unit 204 is compliant with a predetermined wireless communication standard (e.g., Bluetooth (registered trademark), Bluetooth Low Energy ("BLE" hereinafter), ZigBee (registered trademark), or Wi-Fi (registered trademark)).

The power receiving unit 105 uses a coil antenna or the like to receive power transmitted wirelessly from the wireless power transmission apparatus 201.

The battery 106 is a chargeable battery (e.g., a lithium ion battery), and can be removed from the wireless power receiving apparatus 101. A battery authentication unit 107 determines whether or not the battery 106 is a genuine battery. For example, the battery authentication unit 107 reads out ID information or the like unique to the battery 106 from the battery 106, and compares the read-out ID information with ID information stored in advance in the memory of the control unit 102. If the two pieces of ID information match, the battery 106 is determined to be a genuine battery, whereas if the two pieces of ID information do not match, the battery 106 is determined to be a non-genuine battery. If the battery authentication unit 107 has determined that the battery 106 is a non-genuine battery, the control unit 102 controls the power control unit 103 to stop charging the battery 106 as a safety measure. This is because the charging profile of the non-genuine battery is unclear.

A display unit 108 includes a display panel (e.g., a liquid crystal display (LCD) panel). The display unit 108 may have any form as long as a user can be notified of detailed information pertaining to the charging state of the battery 106 through text or images. Using the display unit 108 makes it possible to notify the user of the detailed information pertaining to the charging state with text or images.

A simple display unit 109 is a simplified display unit including a light source (e.g., a light-emitting diode (LED)). The simple display unit 109 can issue warnings to the user by lighting or flashing the LED, for example. For example, warnings can be issued to the user by lighting the LED while the battery 106 is being charged and flashing the LED if the battery 106 cannot be charged. The wireless power receiving apparatus 101 being in an incorrect attitude, positional deviation between the power receiving unit 105 and a power transmission unit 205, and so on can be thought of as situations where charging is not possible. Note that the LED cannot notify the user of detailed information pertaining to the charging state of the battery 106.

A storage unit 110 stores information pertaining to power required for battery authentication, information pertaining to power required to charge the battery 106, and so on.

A contact detecting unit 111 detects contact between the user and the wireless power receiving apparatus 101. A method that uses an accelerometer to detect when the user has made contact with the wireless power receiving apparatus 101 and the wireless power receiving apparatus 101 has moved as a result can be thought of as one example of a detection method.

A wireless power transmission apparatus 201 is an apparatus that transmits power wirelessly to the wireless power receiving apparatus 101.

A control unit 202 includes memory storing programs for controlling the various components of the wireless power transmission apparatus 201, which will be described later, and a processor controlling the various components of the wireless power transmission apparatus 201 by executing the programs stored in that memory. The processor of the control unit 202 is a hardware processor, for example.

A power source unit 203 operates as, for example, an AC adapter that transforms AC power from an AC power source into DC power. The power source unit 203 can be removed from the wireless power transmission apparatus 201, but may be built into the wireless power transmission apparatus 201.

The communication unit 204 communicates wirelessly with the communication unit 104. The power transmission unit 205 transmits power wirelessly to the wireless power receiving apparatus 101 by using a coil antenna or the like.

Figure 2A:
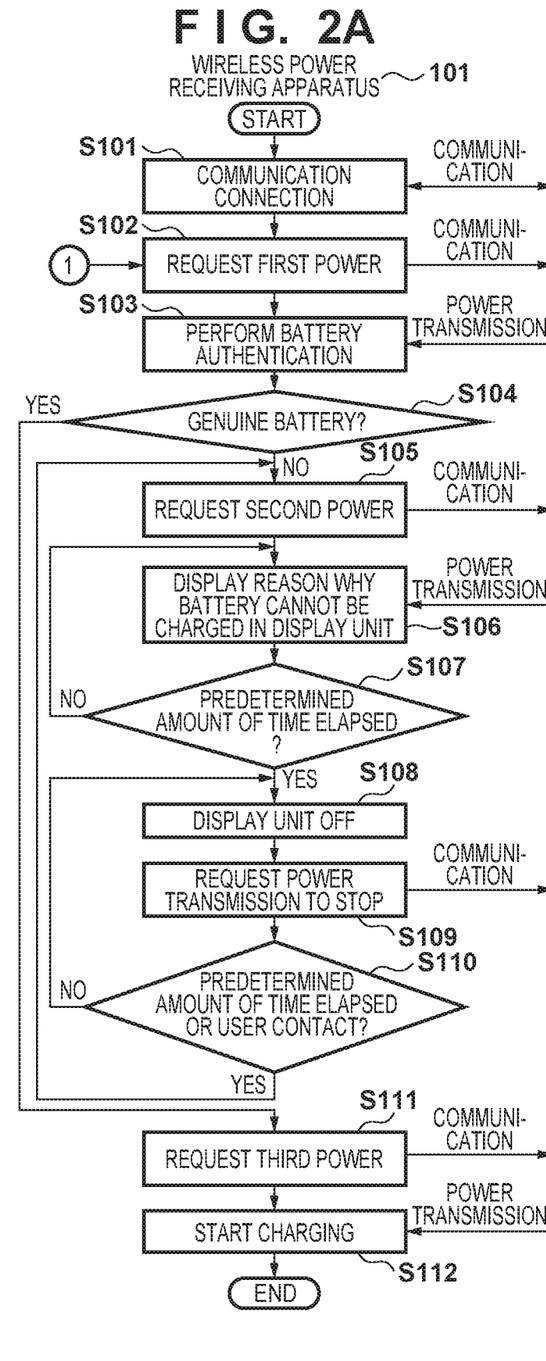
FIG. 2A is a flowchart illustrating an exemplary operation of the wireless power receiving apparatus 101.
Figure 2B:
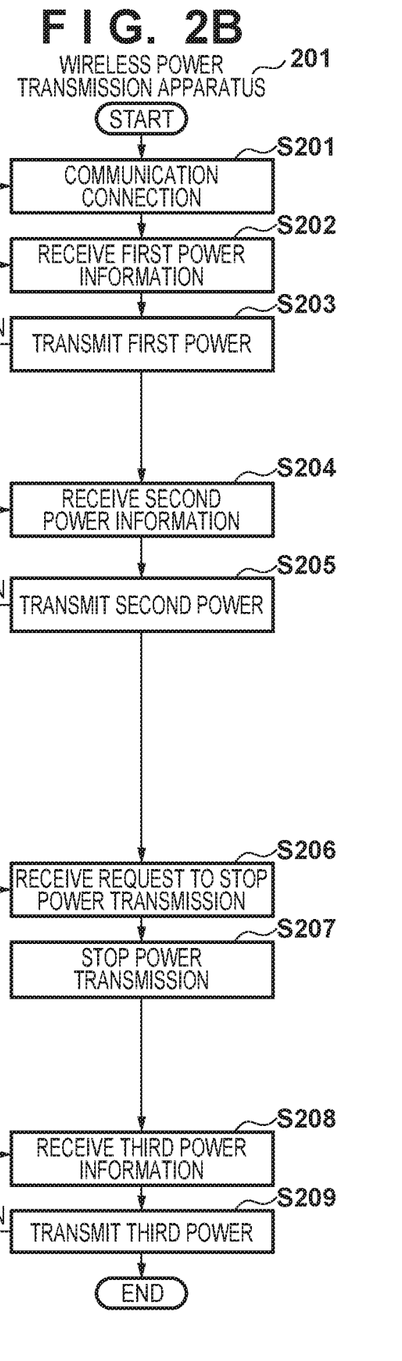
FIG. 2B is a flowchart illustrating an exemplary operation of the wireless power transmission apparatus 201.

An exemplary operation of the wireless power receiving apparatus 101 and an exemplary operation of the wireless power transmission apparatus 201 will be described next with reference to the flowcharts in FIGS. 2A and 2B. FIG. 2A is a flowchart illustrating an exemplary operation of the wireless power receiving apparatus 101 according to the first embodiment. FIG. 2B is a flowchart illustrating an exemplary operation of the wireless power transmission apparatus 201 according to the first embodiment. The following describes an exemplary operation of the wireless power receiving apparatus 101 and the wireless power transmission apparatus 201 in a situation where wireless power transmission is started in response to the user placing the wireless power receiving apparatus 101 onto the wireless power transmission apparatus 201.

The operations of the wireless power receiving apparatus 101 described with reference to FIG. 2A are controlled by the processor of the control unit 102 executing a program stored in the memory of the control unit 102. Likewise, the operations of the wireless power transmission apparatus 201 described with reference to FIG. 2B are controlled by the processor of the control unit 202 executing a program stored in the memory of the control unit 202.

In step S101, the control unit 102 controls the communication unit 104 to make a communication connection.

In step S201, the control unit 202 controls the communication unit 204 to make a communication connection with the communication unit 104.

In step S102, the control unit 102 transmits, from the communication unit 104 to the communication unit 204, a first power request for requesting first power at which battery authentication can be carried out. The first power is power necessary for a battery authentication process carried out between the battery authentication unit 107 and the control unit 102, and can be specified, for example, by measuring the necessary power in advance. If first power information is stored in the storage unit 110, the communication unit 104 can transmit, to the wireless power transmission apparatus 201, the first power information stored in the storage unit 110.

In step S202, the communication unit 204 receives the first power information from the wireless power receiving apparatus 101, and notifies the control unit 202 of the received first power information.

In step S203, the power transmission unit 205 wirelessly transmits, to the power receiving unit 105, the first power based on the first power information received from the wireless power receiving apparatus 101. In this case, there are situations where the received power varies due to a coupling coefficient or the like between the power transmission unit 205 and the power receiving unit 105, even if the transmitted power is constant. Accordingly, the control unit 202 adjusts power transmitted by the power transmission unit 205 to achieve an appropriate level of received power.

In step S103, the power receiving unit 105 receives the first power transmitted from the power transmission unit 205. The power control unit 103 supplies the first power received by the power receiving unit 105 to the control unit 102 or the like. The control unit 102 performs the battery authentication by using the first power.

In step S104, the control unit 102 determines whether or not the battery 106 is a genuine battery on the basis of the result of the battery authentication carried out in step S103. If the battery 106 is determined to be a genuine battery, the control unit 102 moves to step S111. However, if the battery 106 is determined to be a non-genuine battery, the control unit 102 moves to step S105.

In step S111, the control unit 102 carries out communication between the communication unit 104 and the communication unit 204, and transmits, to the communication unit 204, third power information pertaining to power necessary for charging the battery 106.

In step S208, the communication unit 204 receives the third power information from the communication unit 104, and notifies the control unit 202 of the received third power information.

In step S209, the power transmission unit 205 wirelessly transmits, to the power receiving unit 105, third power based on the third power information received in step S208. In this case, there are situations where the received power varies due to a coupling coefficient or the like between the power transmission unit 205 and the power receiving unit 105, even if the transmitted power is constant. Accordingly, the control unit 202 adjusts power transmitted by the power transmission unit 205 to achieve an appropriate level of received power.

In step S112, the power receiving unit 105 receives the third power transmitted from the power transmission unit 205, and the power control unit 103 starts charging the battery 106 with power received by the power receiving unit 105.

In step S105, the control unit 102 controls the power control unit 103 to stop charging the battery 106 as a safety measure. This is because the charging profile of the non-genuine battery is unclear. The control unit 102 furthermore carries out communication between the communication unit 104 and the communication unit 204, and transmits a second power request for requesting second power enabling the display unit 108 to operate.

In step S204, the control unit 202 receives second power information via the communication unit 204, and notifies the control unit 202 of the received second power information.

In step S205, the power transmission unit 205 wirelessly transmits, to the power receiving unit 105, the second power required by the wireless power receiving apparatus 101. In this case, there are situations where the received power varies due to a coupling coefficient or the like between the power transmission unit 205 and the power receiving unit 105, even if the transmitted power is constant. Accordingly, the control unit 202 adjusts power transmitted by the power transmission unit 205 to achieve an appropriate level of received power.

Figure 5A:
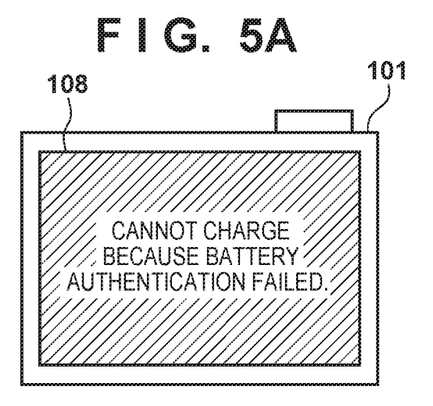
FIGS. 5A to 5C are diagrams illustrating display examples according to the first embodiment and the second embodiment.

In step S106, the power receiving unit 105 receives the second power from the power transmission unit 205, and the display unit 108 uses the second power received by the power receiving unit 105 to display a reason why charging cannot be carried out. A display such as "the battery cannot be charged because battery authentication failed", as indicated in FIG. 5A, is made to notify the user of the reason why the battery cannot be charged.

In step S107, the control unit 102 continues the display of step S106 for a predetermined amount of time. It is desirable that the amount of time for which the reason why the battery cannot be charged is displayed be set to an amount of time from when the user places the wireless power receiving apparatus 101 onto the wireless power transmission apparatus 201 to when the user moves away from the wireless power transmission apparatus 201. Alternatively, the user may be able to set a desired amount of time. If the predetermined amount of time has elapsed in step S107, the control unit 102 moves to step S108, and turns the display unit 108 off.

In step S109, the control unit 102 carries out communication between the communication unit 104 and the communication unit 204, and transmits a transmission stop request for stopping the transmission of the second power.

In step S206, the communication unit 204 receives the transmission stop request for the second power, and notifies the control unit 202.

In step S207, the control unit 202 stops the transmission of the second power from the power transmission unit 205. As a result, unnecessary power transmission is avoided, which makes it possible to conserve electricity.

In step S110, the control unit 102 returns to step S108 if the predetermined amount of time has not elapsed or if no contact with the user has been detected, where, with the display unit 108 remaining off, the transmission of the second power from the power transmission unit 205 is stopped.

In step S110, the control unit 102 returns to step S105 if the predetermined amount of time has elapsed or if contact with the user has been detected. The communication unit 104 then requests the second power again, and the display unit 108 again displays the reason why the battery cannot be charged. Whether or not the predetermined amount of time has elapsed can be determined, for example, by using a tinier function employing a real time clock included in the control unit 102, the communication unit 104, the power control unit 103, or the like. The period for which the reason why the battery cannot be charged is displayed may be made so that the user can set a desired amount of time in advance.

In the first embodiment, the battery authentication is performed and the display is made in the display unit 108 by using power transmitted from the power transmission unit 205. However, if the remaining battery charge is greater than or equal to a predetermined amount, power from the battery may be used along with power transmitted from the power transmission unit 205.

Additionally, in the first embodiment, the user is notified of the reason why the battery cannot be charged by using the display unit 108. However, there are situations where the reason why the battery cannot be charged is that the wireless power receiving apparatus 101 is in an incorrect attitude or there is positional deviation between the power receiving unit 105 and the power transmission unit 205. In such situations, a warning is issued to the user by using the simple display unit 109. Additionally, if the battery 106 cannot be charged despite the wireless power receiving apparatus 101 being placed correctly, the user may be notified of detailed information by using the display unit 108. In this manner, the user can be notified of the reason why the battery cannot be charged in an easily-understandable manner depending on the reason why the battery cannot be charged.

As described thus far, if the battery 106 is a non-genuine battery, the wireless power receiving apparatus 101 can display a reason why the connected power source is not being charged in the display unit 108. As a result, the user can be notified of the reason why the battery 106 is not being charged in an easily-understandable manner.

Second Embodiment

The first embodiment describes an example in which the user is notified of the reason why the battery cannot be charged when the battery authentication indicates that the battery 106 is a non-genuine battery. However, the second embodiment assumes a situation where the battery 106 being neither a genuine battery nor a non-genuine battery serves as a reason why the battery cannot be charged. Thus the second embodiment describes an example in which the user is notified of the reason why the battery cannot be charged even if the battery 106 is neither a genuine battery nor a non-genuine battery.

Figure 3:
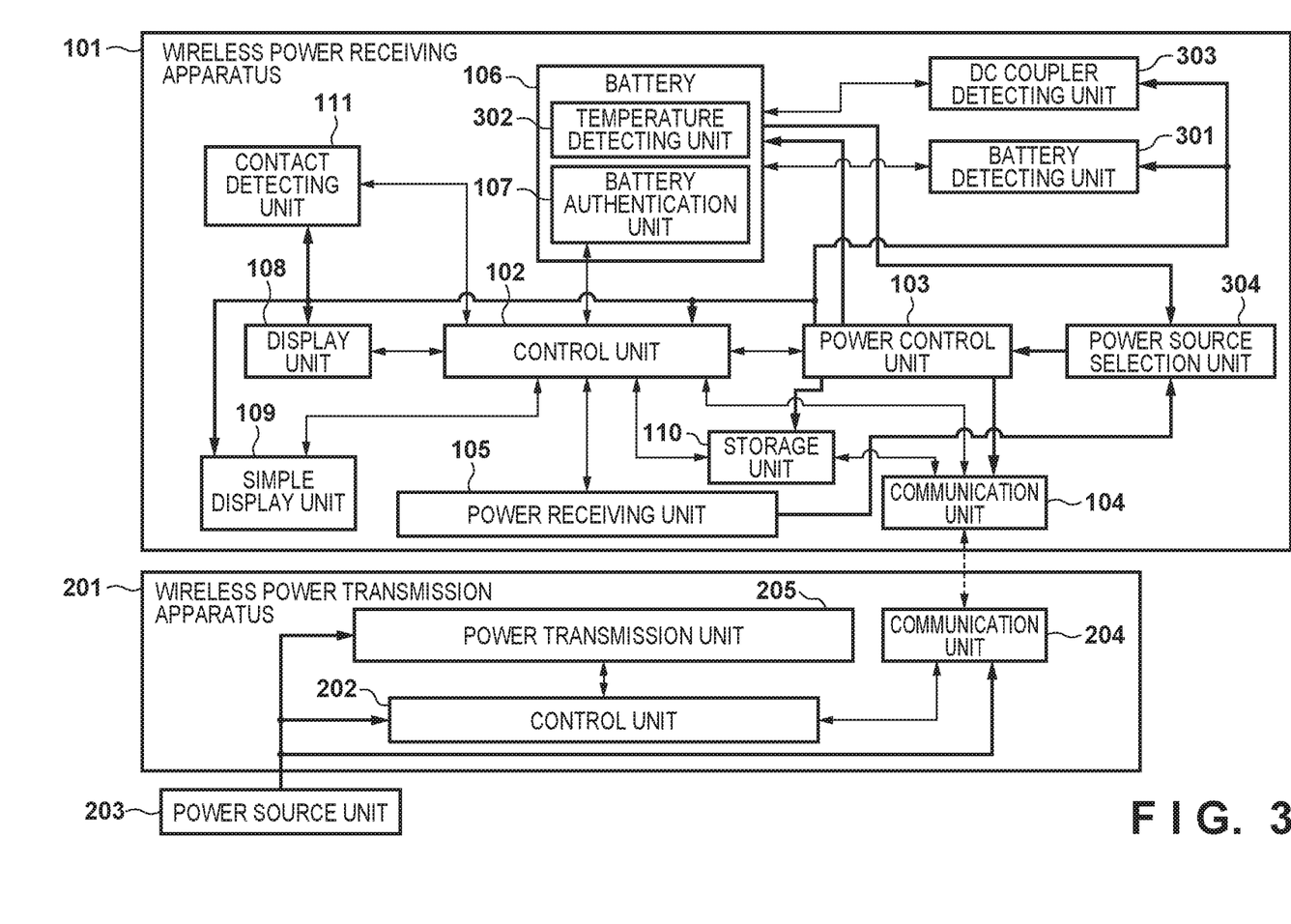
FIG. 3 is a block diagram illustrating components of a wireless power receiving apparatus 101 according to a second embodiment and components of a wireless power transmission apparatus 201 according to the second embodiment.

Components of a wireless power receiving apparatus 101 according to the second embodiment and components of a wireless power transmission apparatus 201 according to the second embodiment will be described with reference to FIG. 3. In FIG. 3, bold arrows indicate the flow of power, and normal arrows indicate the flow of data or signals.

Components of the wireless power transmission apparatus 201 illustrated in FIG. 3 are the same as components of the wireless power transmission apparatus 201 illustrated in FIG. 1. Thus the same reference signs are given, and descriptions of those elements will be omitted. Components of the wireless power receiving apparatus 101 illustrated in FIG. 3 that have the same configurations and functions as components of the wireless power receiving apparatus 101 illustrated in FIG. 1 will be given the same reference signs, and descriptions of those elements will be omitted. As such, the second embodiment will describe parts different from the components of the wireless power receiving apparatus 101 illustrated in FIG. 1 and components not included in the wireless power receiving apparatus 101 illustrated in FIG. 1.

As illustrated in FIG. 3, unlike the wireless power receiving apparatus 101 according to the first embodiment, the wireless power receiving apparatus 101 according to the second embodiment further includes a battery detecting unit 301, a DC coupler detecting unit 303, and a power source selection unit 304. Furthermore, unlike the battery 106 according to the first embodiment, the battery 106 according to the second embodiment further includes a temperature detecting unit 302.

The temperature detecting unit 302 is a device for detecting a temperature within the battery 106 (e.g., a thermistor). The battery detecting unit 301 detects whether or not the battery 106 is connected to the wireless power receiving apparatus 101 on the basis of a resistance value from the temperature detecting unit 302. The method of detecting whether or not the battery 106 is connected to the wireless power receiving apparatus 101 is not limited to this method, and another method may be used instead.

The DC coupler detecting unit 303 detects a voltage value for a situation where a DC coupler is connected instead of the battery 106, and detects whether or not power is being supplied. This is done to detect that the DC coupler is connected instead of the battery 106, and that power is being supplied through the DC coupler from a commercial power source or the like, as a reason why the battery cannot be charged, aside from the battery being a non-genuine battery. The DC coupler does not require temperature management like a battery, and thus the thermistor is not necessary when a DC coupler is being used. Thus the DC coupler being connected instead of the battery 106 can, using the battery detecting unit 301 and the DC coupler detecting unit 303, be detected as a reason why the battery cannot be charged, aside from the battery being a non-genuine battery. Although the second embodiment describes a method where the DC coupler detecting unit 303 detects a voltage value, another detection method may be used as long as whether or not the DC coupler is connected can be detected.

The power source selection unit 304 selects the battery 106, the DC coupler, or the power receiving unit 105 as the power source of the wireless power receiving apparatus 101. The power source selection unit 304 can be configured, for example, using two diodes having a common cathode, with the cathode side connected to the power control unit 103, the anode of one of the diodes connected to the battery 106, and the anode of the other diode connected to the power receiving unit 105.

Figure 4A:
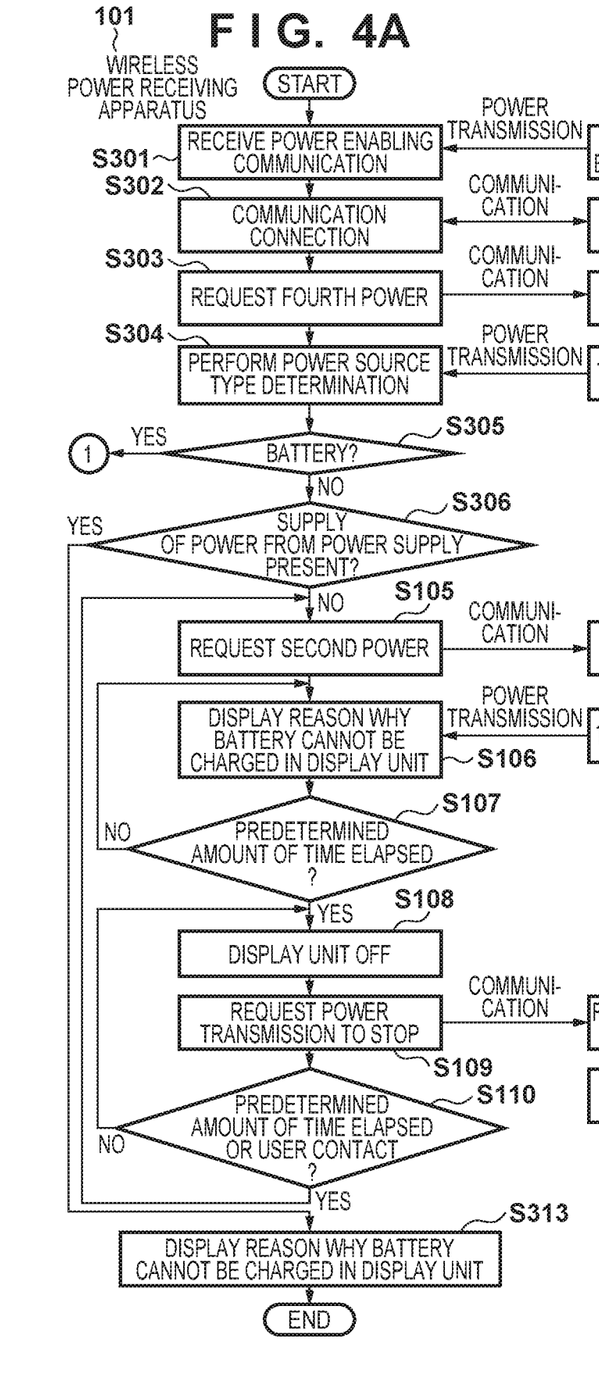
FIG. 4A is a flowchart illustrating an exemplary operation of the wireless power receiving apparatus 101.
Figure 4B:
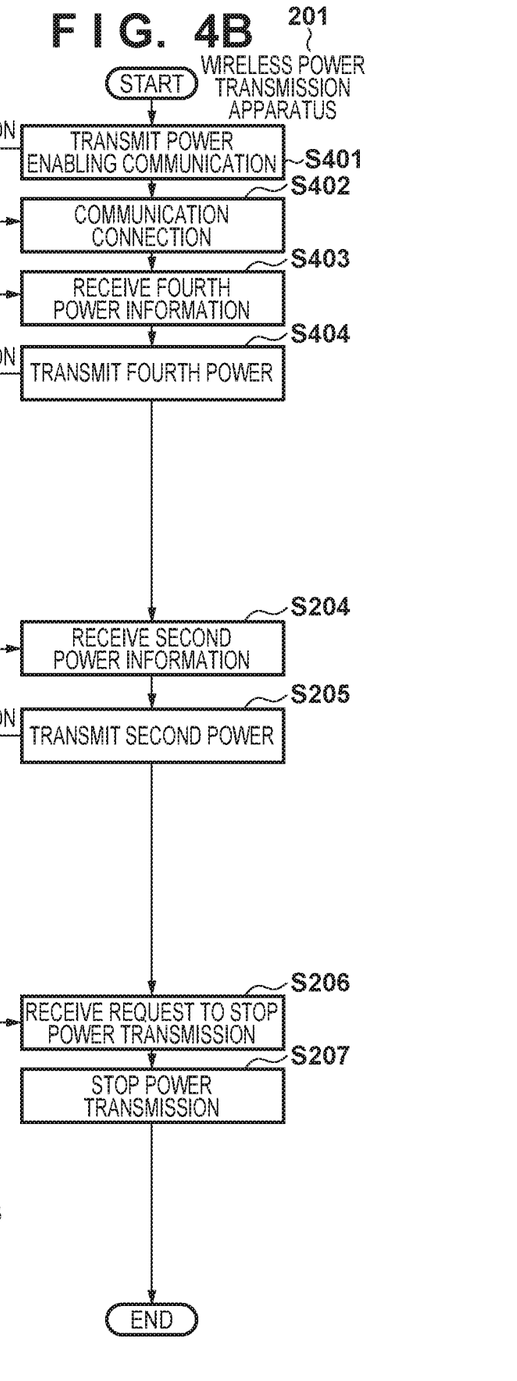
FIG. 4B is a flowchart illustrating an exemplary operation of the wireless power transmission apparatus 201.

An exemplary operation of the wireless power receiving apparatus 101 and an exemplary operation of the wireless power transmission apparatus 201 will be described next with reference to the flowcharts in FIGS. 4A and 4B. FIG. 4A is a flowchart illustrating an exemplary operation of the wireless power receiving apparatus 101 according to the second embodiment. FIG. 4B is a flowchart illustrating an exemplary operation of the wireless power transmission apparatus 201 according to the second embodiment. The following describes an exemplary operation of the wireless power receiving apparatus 101 and the wireless power transmission apparatus 201 in a situation where wireless power transmission is started in response to the user placing the wireless power receiving apparatus 101 onto the wireless power transmission apparatus 201.

The operations of the wireless power receiving apparatus 101 described with reference to the flowchart in FIG. 4A are controlled by the processor of the control unit 102 executing a predetermined program stored in the memory of the control unit 102. Likewise, the operations of the wireless power transmission apparatus 201 described with reference to the flowchart in FIG. 4B are controlled by the processor of the control unit 202 executing a predetermined program stored in the memory of the control unit 202.

In step S401, the power transmission unit 205 wirelessly transmits power required for the communication unit 104 to communicate with the communication unit 204. In this case, there are situations where the received power varies due to a coupling coefficient or the like between the power transmission unit 205 and the power receiving unit 105, even if the transmitted power is constant. Accordingly, the control unit 202 adjusts power transmitted by the power transmission unit 205 to achieve an appropriate level of received power.

In step S301 the power receiving unit 105 receives power transmitted from the power transmission unit 205.

In step S302, the control unit 102 controls the communication unit 104 to make a communication connection.

In step S402, the control unit 202 controls the communication unit 204 to make a communication connection with the communication unit 104.

In step S303, the control unit 102 transmits, from the communication unit 104 to the communication unit 204, a fourth power request for requesting fourth power at which a power source type determination can be made. The fourth power is power necessary for the detection process carried out by the battery detecting unit 301 and the voltage detection process carried out by the DC coupler detecting unit 303, and can be specified, for example, by measuring necessary power information in advance. If fourth power information is stored in the storage unit 110, the communication unit 104 can transmit, to the wireless power transmission apparatus 201, the fourth power information stored in the storage unit 110.

In step S403, the communication unit 204 receives the fourth power information from the wireless power receiving apparatus 101 and notifies the control unit 202.

In step S404, the power transmission unit 205 wirelessly transmits, to the power receiving unit 105, the fourth power based on the fourth power information received from the communication unit 104. In this case, there are situations where the received power varies due to a coupling coefficient or the like between the power transmission unit 205 and the power receiving unit 105, even if the transmitted power is constant. Accordingly, the control unit 202 adjusts power transmitted by the power transmission unit 205 to achieve an appropriate level of received power.

In step S304, the power receiving unit 105 receives the fourth power transmitted from the power transmission unit 205. The power control unit 103 supplies the fourth power received by the power receiving unit 105 to the battery detecting unit 301 or the like. The battery detecting unit 301 makes the power source type determination using the fourth power.

In step S305, the control unit 102 moves to step S102 of FIG. 2A if, as a result of the power source type determination made in step S304, it has been determined that the battery 106 is connected to the wireless power receiving apparatus 101. The control unit 102 moves to step S306 if it has been determined in step S304 that the battery 106 is not connected to the wireless power receiving apparatus 101.

In step S306, the DC coupler detecting unit 303 detects a voltage value, and detects whether or not power is being supplied. If power is being supplied in step S306, the control unit 102 moves to step S313, whereas if power is not being supplied, the control unit 102 moves to step S105.

Figure 5B:
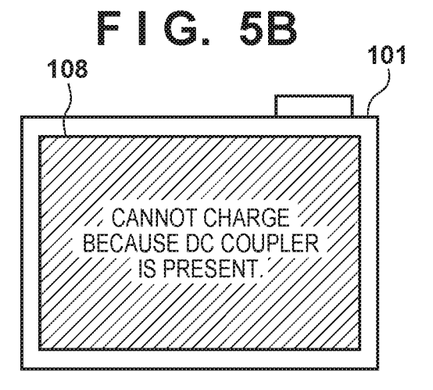

In step S313, the control unit 102 determines that the DC coupler is connected instead of the battery 106 and that power is being supplied from an AC power source through the DC coupler. The control unit 102 then uses power from the DC coupler to display the reason why the battery cannot be charged in the display unit 108. A display such as "the battery cannot be charged because a DC coupler is present", as indicated in FIG. 5B, is made to notify the user of the reason why the battery cannot be charged.

The processes carried out in steps S105 to S110 in FIG. 4A are the same as the processes carried out in steps S105 to S110 in FIG. 2A, and will therefore not be described. Likewise, the processes carried out in steps S204 to S207 in FIG. 4B are the same as the processes carried out in steps S204 to S207 in FIG. 2B, and will therefore not be described.

Figure 5C:
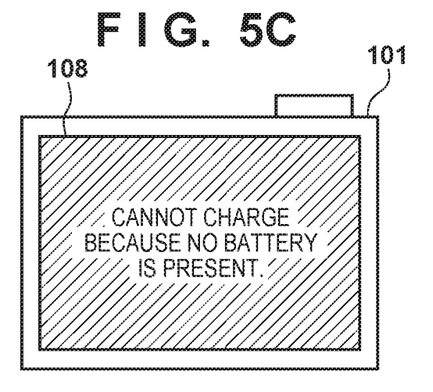

However, in step S106, the power receiving unit 105 receives the second power from the power transmission unit 205, and the display unit 108 uses the second power received by the power receiving unit 105 to display the reason why the battery cannot be charged. A display such as "the battery cannot be charged because the battery is not present", as indicated in FIG. 5C, is made to notify the user of the reason why the battery cannot be charged.

Although the second embodiment describes using power transmitted from the power transmission unit 205 to make communication connections, determine the power source, make displays in the display unit 108, and so on, the configuration is not limited thereto. For example, power from the DC coupler may be used along with power transmitted from the power transmission unit 205.

Additionally, although the second embodiment describes notifying the user of the reason why the battery cannot be charged by using the display unit 108, the DC coupler or the battery being improperly connected can also be a reason why the battery cannot be charged. In such a situation, a warning may be issued to the user by using the simple display unit 109.

As described thus far, if the connected power source is a DC coupler, the wireless power receiving apparatus 101 can display a reason why the connected power source is not being charged in the display unit 108. As a result, the user can be notified of the reason why the battery 106 is not being charged in an easily-understandable manner.

Third Embodiment

Various functions, processes, or methods described in the first and second embodiments can also be implemented by a personal computer, a microcomputer, a CPU (Central Processing Unit), a processor, or the like by using a program. In the third embodiment, a personal computer, a microcomputer, a CPU (Central Processing Unit), a processor, or the like will be called a "computer X". Also, in the third embodiment, a program for controlling the computer X and implementing the various functions, processes, or methods described in the first and second embodiments will be called a "program Y".

The various functions, processes, or methods described in the first and second embodiments are implemented by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2017-141999, filed Jul. 21, 2017, which is hereby incorporated by reference herein in its entirety.

What is claimed is:

1. A power receiving apparatus comprising:
a power receiving unit that receives first power or second power from a power transmission apparatus; and
a control unit that (a) controls a wireless communication unit of the power receiving apparatus to transmit a first request for requesting the power transmission apparatus to transmit the first power by wireless power transmission, (b) determines whether or not a battery attached to the power receiving apparatus is a predetermined battery by using the first power transmitted from the power transmission apparatus, (c) controls the wireless communication unit of the power receiving apparatus to transmit a second request for requesting the power transmission apparatus to transmit the second power by wireless power transmission, in a case where the battery attached to the power receiving apparatus is not the predetermined battery, and (d) controls a display unit of the power receiving apparatus to notify a user of a reason why the battery attached to the power receiving apparatus is not being charged, in a case where the battery attached to the power receiving apparatus is not the predetermined battery and the second request is transmitted to the power transmission apparatus, wherein the display unit of the power receiving apparatus uses the second power transmitted from the power transmission apparatus to notify a user of a reason why the battery attached to the power receiving apparatus is not being charged.

2. The power receiving apparatus according to claim 1, wherein the control unit controls the wireless communication unit of the power receiving apparatus to transmit a third request for requesting the power transmission apparatus to transmit third power by wireless power transmission, in a case where the battery attached to the power receiving apparatus is the predetermined battery, and wherein a charging unit of the power receiving apparatus charges the battery attached to the power receiving apparatus with the third power transmitted from the power transmission apparatus, in a case where the battery attached to the power receiving apparatus is the predetermined battery.

3. The power receiving apparatus according to claim 1, wherein the display unit of the power receiving apparatus uses a text or an image to notify a user of a reason why the battery attached to the power receiving apparatus is not being charged.

4. The power receiving apparatus according to claim 1, wherein the display unit of the power receiving apparatus includes a light source, and wherein the display unit of the power receiving apparatus uses the light source to notify a user of a reason why the battery attached to the power receiving apparatus is not being charged.

5. The power receiving apparatus according to claim 1, wherein the control unit controls the display unit of the power receiving apparatus to stop notifying a user of a reason why the battery attached to the power receiving apparatus is not being charged, in a case where the display unit of the power receiving apparatus notifies a user of a reason why the battery attached to the power receiving apparatus is not being charged and a predetermined time elapsed.

6. The power receiving apparatus according to claim 1, wherein the power receiving apparatus is capable of acting as an image capture apparatus.

7. The power receiving apparatus according to claim 1, wherein the power receiving apparatus is capable of acting as a mobile phone or a mobile terminal.

8. A method comprising:
controlling a wireless communication unit of a power receiving apparatus to transmit a first request for requesting a power transmission apparatus to transmit first power by wireless power transmission;
determining whether or not a battery attached to the power receiving apparatus is a predetermined battery by using the first power transmitted from the power transmission apparatus;
controlling the wireless communication unit of the power receiving apparatus to transmit a second request for requesting the power transmission apparatus to transmit second power by wireless power transmission, in a case where the battery attached to the power receiving apparatus is not the predetermined battery; and controlling a display unit of the power receiving apparatus to notify a user of a reason why the battery attached to the power receiving apparatus is not being charged, in a case where the battery attached to the power receiving apparatus is not the predetermined battery and the second request is transmitted to the power transmission apparatus, wherein the display unit of the power receiving apparatus uses the second power transmitted from the power transmission apparatus to notify a user of a reason why the battery attached to the power receiving apparatus is not being charged.

9. The method according to claim 8, further comprising:
controlling the wireless communication unit of the power receiving apparatus to transmit a third request for requesting the power transmission apparatus to transmit third power by wireless power transmission, in a case where the battery attached to the power receiving apparatus is the predetermined battery, and causing a charging unit of the power receiving apparatus to charge the battery attached to the power receiving apparatus with the third power transmitted from the power transmission apparatus, in a case where the battery attached to the power receiving apparatus is the predetermined battery.

10. The method according to claim 8, wherein the display unit of the power receiving apparatus uses a text or an image to notify a user of a reason why the battery attached to the power receiving apparatus is not being charged.

11. The method according to claim 8, wherein the display unit of the power receiving apparatus includes a light source, and wherein the display unit of the power receiving apparatus uses the light source to notify a user of a reason why the battery attached to the power receiving apparatus is not being charged.

12. The method according to claim 8, further comprising:
controlling the display unit of the power receiving apparatus to stop notifying a user of a reason why the battery attached to the power receiving apparatus is not being charged, in a case where the display unit of the power receiving apparatus notifies a user of a reason why the battery attached to the power receiving apparatus is not being charged and a predetermined time elapsed.

13. The method according to claim 8, wherein the power receiving apparatus is capable of acting as an image capture apparatus.

14. The method according to claim 8, wherein the power receiving apparatus is capable of acting as a mobile phone or a mobile terminal.

15. A non-transitory storage medium that stores a program causing a computer to execute a method, the method comprising:
controlling a wireless communication unit of a power receiving apparatus to transmit a first request for requesting a power transmission apparatus to transmit first power by wireless power transmission;
determining whether or not a battery attached to the power receiving apparatus is a predetermined battery by using the first power transmitted from the power transmission apparatus;
controlling the wireless communication unit of the power receiving apparatus to transmit a second request for requesting the power transmission apparatus to transmit second power by wireless power transmission, in a case where the battery attached to the power receiving apparatus is not the predetermined battery; and controlling a display unit of the power receiving apparatus to notify a user of a reason why the battery attached to the power receiving apparatus is not being charged, in a case where the battery attached to the power receiving apparatus is not the predetermined battery and the second request is transmitted to the power transmission apparatus, wherein the display unit of the power receiving apparatus uses the second power transmitted from the power transmission apparatus to notify a user of a reason why the battery attached to the power receiving apparatus is not being charged.

* * * * *